United States Patent [19]
Gundlach et al.

[11] Patent Number: 5,768,419
[45] Date of Patent: Jun. 16, 1998

[54] METHOD OF CONNECTION HANDLING FOR INTERACTIVE SERVICES

[75] Inventors: Michael Gundlach, Munich; Helmut Becker, Bad Aibling; Hauke Kosciessa, Munich; Walter Tengler, Friedberg, all of Germany

[73] Assignee: Siemens Aktiengesellschaft, Munich, Germany

[21] Appl. No.: 650,847

[22] Filed: May 20, 1996

[30] Foreign Application Priority Data

May 23, 1995 [DE] Germany .................. 195 18 930.2

[51] Int. Cl.[6] ........................................ G06F 12/14
[52] U.S. Cl. ........................................ 395/187.01
[58] Field of Search .................. 395/187.01, 726; 340/825.31, 825.34; 380/3, 21, 28, 25

[56] References Cited

U.S. PATENT DOCUMENTS

| | | | |
|---|---|---|---|
| 5,191,611 | 3/1993 | Lang | 380/25 |
| 5,282,249 | 1/1994 | Cohen et al. | 380/23 |
| 5,392,353 | 2/1995 | Morales | 380/20 |
| 5,539,448 | 7/1996 | Verhille et al. | 348/6 |
| 5,557,654 | 9/1996 | Mäenpää | 379/58 |
| 5,572,442 | 11/1996 | Schulhof et al. | 364/514 C |
| 5,640,453 | 6/1997 | Schuchman et al. | 380/10 |
| 5,644,354 | 7/1997 | Thompson et al. | 348/13 |
| 5,648,958 | 7/1997 | Counterman | 370/458 |

FOREIGN PATENT DOCUMENTS 36 08 028 A1  9/1987  Germany.

OTHER PUBLICATIONS

IEEE Communications Magazine, vol. 32, No. 5, May (1994), An Open–Systems Approach to Video on Demand, by Chang et al, pp. 68–80.

IEEE Communications Magazine, vol. 36, No. 3, Aug. (1990), Smart Cards Provide Very High Security and Flexibility in Subscribers Management, by Peyret et al, pp. 744–752.

IEEE Communications Magazine, May 1994, Interactive Video on Demand, by D. Deloddere et al, pp. 82–88.

*Primary Examiner*—Robert W. Beausoliel, Jr.
*Assistant Examiner*—Stephen C. Elmore
*Attorney, Agent, or Firm*—Hill & Simpson

[57] ABSTRACT

For making use of interactive services, it is essential that the individual needs of the users be satisfied while taking the security aspect into consideration. The method resolves this in that a connection setup to the user is only handled when an authorization of the appertaining user can be verified based on the comparison of two numerical values.

19 Claims, 1 Drawing Sheet

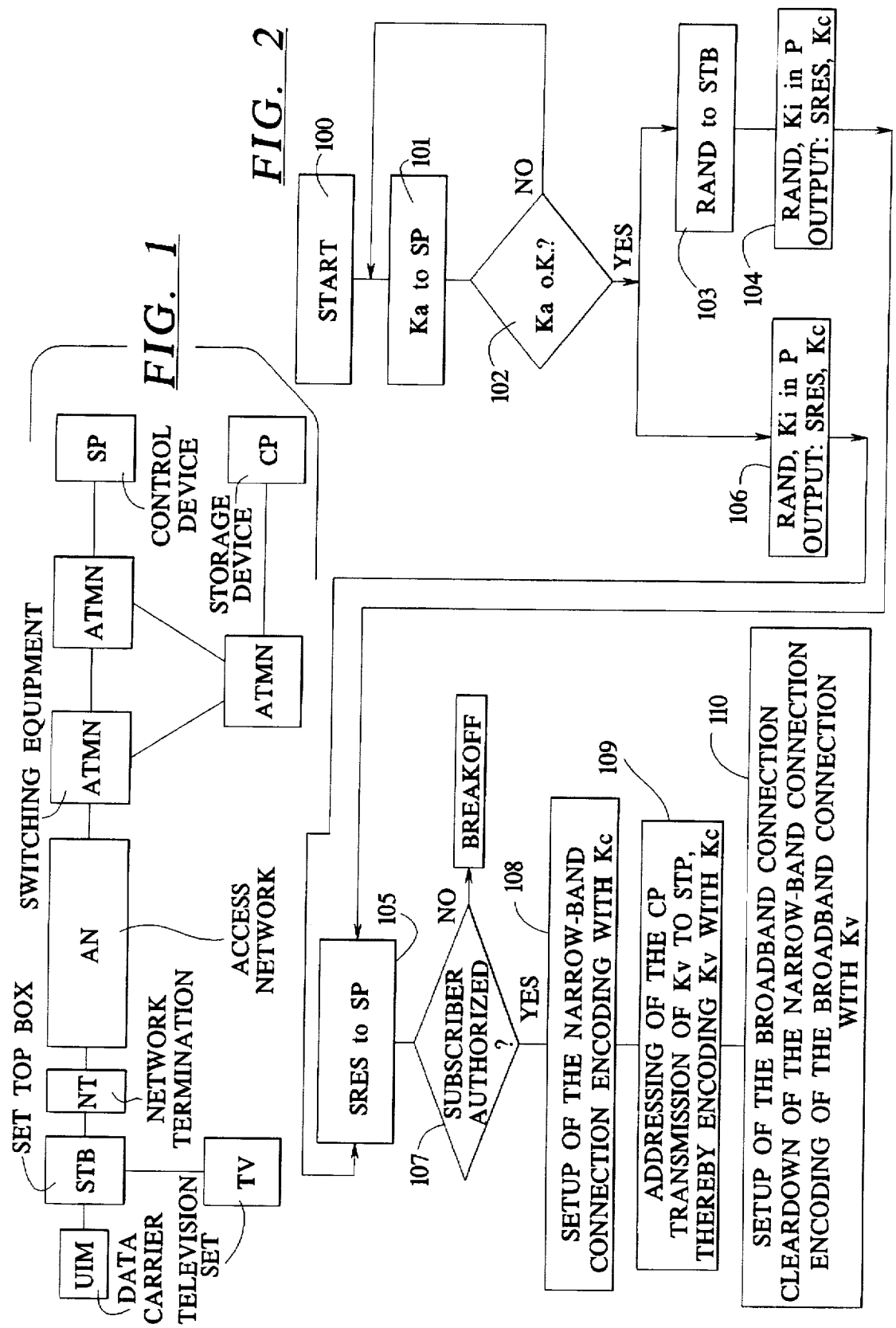

5,768,419

METHOD OF CONNECTION HANDLING FOR INTERACTIVE SERVICES

BACKGROUND OF THE INVENTION

The present invention is directed to connection handling methods for use with interaction service.

At present, services that integrate a plurality of services and allow the user to perform interactions are combined under the collective term of interactive multimedia services. Included among these are specific services such as, for example, video on demand or distant learning that are accessed from terminal equipment installed at a location of the user. It is obvious to use television sets as such terminal equipment since, first, large numbers of these are owned by users and, second, they offer the user the possibility optically or acoustically carrying on a dialogue with the respective service vendor.

Specific control devices are utilized at the user for handling these executions. These control devices are referred to as set top boxes and are connected to a television set as an auxiliary means. As a rule, they are inserted into the communication link leading to the television set. Simple set top boxes can thereby decode additional television channels such as, for example, pay TV and display corresponding information on the video screen of the respective television set. Higher-performance set top boxes can be interactively driven by the user using a remote control in order to utilize the aforementioned, specific services. With the availability of memories with higher and higher capacity, that are also more cost-beneficial, calling video films (video on demand) has become technologically realizable and has also been increasingly offered by the service vendors. The video films are stored as warranted in compressed form in large digital memory devices that are referred to as content providers.

Via a data transmission network, a set top box sets up a connection to a respective content provider and controls the selection and playback of, for example, video films dependent on the user's inputs. In the prior art coaxial networks are used as data transmission networks. The correspondingly converted television video signals are thereby supplied to all users in the sense of a broadcast transmission. What is thereby problematical, in particular, is that each and every user has specific wishes regarding the utilization of the services, and these must be handled. In the prior art, a subscriber-associated identifier is usually established, this reflecting the authorization of a user to make use of a service.

German Published Application DE 36 08 028 A1 discloses a method for checking access authorization to a signal processing system. A code word is thereby deposited in the relevant periphery equipment, this code word being representative thereof. What is disadvantageous about this, however, is that such a procedure greatly restricts the mobility of the respective user. Furthermore, the deposited code word can be identified by other users under certain circumstances, a situation that must be avoided.

SUMMARY OF THE INVENTION

It is an object of the present invention to provide a way of satisfying individual needs of the users in making use of interactive video services while taking the security aspect as well as the mobility of the user into account.

In general terms the present invention is a method of connection handling for interactive services, having peripheral control devices as well as at least one network node that form a transmission network. At least one storage means and at least one control means are connected to the transmission network. Via the transmission network information from one of the storage means to respectively one of the peripheral control devices and vice versa is conducted using an existing connection. A first connection setup from one of the peripheral control devices to the at least one control means is only handled based on the criterion of a comparison of two numerical values when a first numerical value calculated in the appertaining peripheral control device coincides with a second numerical value calculated in the at least one control means. A second connection setup between the at least one storage means and the peripheral control device is handled following thereupon as warranted, based on the criterion of a selection signal output by the peripheral control device.

The advantage of the present invention is that a connection setup from a user to the allocated control device is only handled when the user's personal identifier allows it. To this end, a first numerical value is calculated at the user according to the criterion of an algorithm procedure, and the result is communicated to the control device. The same arithmetic calculations are isochronically carried out at the control device using an identical procedure, and the results of the two calculations are compared to one another.

In a further embodiment of the present invention the first numerical value is determined in that an identifier is taken from a data carrier of the peripheral control device. This identifier together with a random number received from the control device is supplied as an input value to a first procedure that, using a defined algorithm, generates the first numerical value as an output value and sends it to the control device.

It is provided here that the first numerical value is determined in that an identifier is taken from a data carrier of the peripheral control device, this identifier together with a random number received from the control device being supplied as an input value to a first procedure that, using a defined algorithm, generates the first numerical value as an output value and sends it to the control device. This involves the advantage that, due to the use of the random number, the second identifier cannot be detected by, for example, other users. In this respect, an enhanced security aspect has thus been satisfied.

In a further embodiment of the present invention the second numerical value is determined in that the identifier is stored in the control device and is supplied together with the generated random number as an input value to a second procedure that calculates the second numerical value as an output value.

It is provided here that the second numerical value is determined in that the identifier is stored in the control device and is supplied together with the generated random number as am input value to a second procedure that calculates the second numerical value as an output value. This involves the advantage that the same calculation events are implemented at another location in the network.

In a further embodiment of the present invention the first and second procedures are identical and the comparison is implemented in the control device.

It is provided here that the first and second procedures are identical and that the comparison is implemented in the control device. This involves the advantage that the first connection is only set up when the user's authorization is correct. This involves a further enhancement of the security.

In a further embodiment of the present invention the first procedure, in addition to generating the first numerical value, also generates a further numerical value with which the information transmitted via the first connection are encoded.

It is provided here that the first procedure, in addition to generating the first numerical value, also generates a further numerical value with which the information transmitted via the first connection is encoded. This involves the advantage that the information conducted via the appertaining connection is not accessible to any other user.

In a further embodiment of the present invention the data carrier has a further identifier that potentially has a temporary character.

It is provided here that the data carrier has a further identifier that potentially has a temporary character. This involves the advantage that the anonymity of the user is already established at the connection setup.

In a further embodiment of the present invention a selection signal output by the peripheral control device is supplied to the control device via the first connection. With the selection signal that at least one storage means is addressed, whereupon the latter supplies a code word with the information stored therein via the control device to the appertaining peripheral control device. The code word is encrypted with the further numerical value during the transmission event.

It is provided here that a selection signal output by the peripheral control device is supplied to the control device via the first connection. The at least one memory means is addressed by the selection signal, whereupon the latter supplies a code word stored with the information stored therein via the control device to the appertaining peripheral control device. The code word is encrypted with the further numerical value during the transmission event. This involves a further enhancement of the security.

In a further embodiment of the present invention the code word is modified based on the criterion of the selected service.

It is provided here that the code word is modified based on the criterion of the selected service. What this thereby prevents, for example, is that a video has to be repeatedly transmitted via the television distribution network at one and the same time. Moreover, this also prevents a user from multiply using a video with only one-time payment.

In a further embodiment of the present invention an acknowledge signal is supplied to the control device after receipt of the code word by the appertaining peripheral control device, whereupon, first, the first connection is cleared down and, second, the second connection is set up.

It is provided here that an acknowledge signal is supplied to the control device after receipt of the code word by the appertaining peripheral control device, whereupon, the first connection is cleared down and, second, the second connection is set up. This involves the advantage that the network capacity offered by the cleardown can be allocated to other connections.

In a further embodiment of the present invention a narrowband or, respectively as warranted, a broadband connection is produced during the course of the first or, respectively, second connection setup.

It is provided here that a narrowband or, respectively as warranted, a broadband connection is produced during the course of the first or, respectively, second connection setup. This involves the advantage of an efficient use of network resources.

In a further embodiment of the present invention the data carrier is detachably connected to the peripheral control device.

It is provided here that the data carrier is detachably connected to the peripheral control device. This involves the advantage of an enhanced mobility on the part of the user.

In a further embodiment of the present invention a chip card with integrated processor and memory means on which the first procedure is implemented is used as the data carrier.

It is provided here that a chip card with integrated processor and memory means on which the first procedure is implemented is employed as data carrier. This involves the advantage of simple operation by the user.

In a further embodiment of the present invention the chip card is a prepaid chip card.

It is provided here that the chip card is a pre-paid chip card. This involves the advantage of flexible manipulation by the user. The pre-paid chip card can thereby be both a "throwaway card" as well as a rechargeable card.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 is an arrangement with which the inventive method is implemented; and

FIG. 2 depicts the inventive method in the form of a flowchart.

DESCRIPTION OF THE PREFERRED EMBODIMENTS

FIG. 1 shows an arrangement In which the inventive method is implemented. The peripheral control devices are thereby fashioned as set top boxes STB, whereby only one of these is shown in FIG. 1. Commercially available television sets TV are respectively connected thereto as terminal equipment. Optionally, personal computers (PC) can also be employed. A data carrier UIM can be physically incorporated into a set top box STB by the user as needed. Inventively, a chip card is thereby employed. In a known way, this contains a processor with memory means in which are stored first and second identifiers $K_u, K_i$ as well as a procedure P. The identifier $K_u$ contains the name of the user or, as warranted, a personal identification number (PIN), whereas the identifier $K_i$ represents a random number. The interface of the peripheral control devices (set top box STB) to an access network AN is respectively formed by a network termination means NT. The access network AN is fashioned as a coaxial network via which the video signals are conducted to the individual users in the sense of a broadcast transmission.

The coaxial network AN is also connected to a switching network. This is formed of a plurality of switching equipment ATMN connected to one another. In the present exemplary embodiment the switching equipment transmit information signals according to the asynchronous transfer mode (ATM). The fashioning of the switching network as an ATM network is not compulsory, so that other transmission principles can also be applied. At least one service control device SP as well as at least one storage means CP are also connected to at least one of the switching equipment ATMN. The control devices SP are fashioned as service providers, whereas the storage means CP functions as the content provider. On the one hand, the authorization of the user access to the network is identified in the service providers SP and, on the other hand, the control procedures for the transmission of the information stored in the content providers CP to the appertaining users are controlled therein. It is assumed in the exemplary embodiment that this information consists of video films that are stored in the content providers CP.

A connection setup for calling a video film is initiated by a user using his personal data shall now be described with reference to the flowchart shown in FIG. 2.

The user who wishes to see a video film on his television set TV first inserts his chip card C into the insertion slot provided at his set top box STB (step 100). As a result of this operation, the service provider allocated to his set top box STB is informed with a request signal that this user wishes to make use of a service. During the course of this request, the set top box STB supplies the first identifier $K_a$ taken from the chip card C to the service provider SP (step 100). When the user was placed on line, the identifier $K_a$ was also stored therein, so that the user can be immediately recognized. The recognition of the user thus ensues independently of a specific set top.

Furthermore, upon initialization of the user, the second identifier $K_i$ as well as the co-stored procedure P were also stored in the service provider SP. First and second identifiers as well as the procedure P are thus stored at two locations in the transmission network, namely on the chip card as well as in the service provider SP. In order to already assure the anonymity of a user during the connection setup, a temporary identifier $K_t$ can be employed alternatively to the transmission of the first identifier $K_a$. The first identifier $K_a$ is thereby employed only in the very first connection set up. After a successful connection setup, the temporary identifier $K_t$ is calculated by the service provider SP and transmitted to the set top box STB, potentially with a code $K_c$. The identifier $K_t$ is only valid for the duration of the existing connection and can be re-assigned after every new connection setup.

In response to the request signal output by the appertaining set top box STB, the allocated service provider SP verifies the calling user using (step 102) the first identifier $K_a$. Subsequently, the same service provider SP sends a random number RAND to the appertaining set top box STB (step 103). Together with this second identifier $K_i$ stored on the chip card, this is supplied to the procedure P as an input value. This procedure P is likewise stored on the chip card C and is likewise executed on the co-integrated processor. As an output value, this procedure P calculates, first, a specific numerical value SRES that is communicated to the service provider SP (step 105). Second, a code word $K_c$ is calculated as a further output value and is stored in the set top box STB.

The same operations are implemented in the service provider SP isochronically with this operation. The initially generated random number RAND as well as the second identifier $K_i$ that is likewise stored therein are supplied as input value to the procedure P that is likewise stored therein (step 106). A specific numerical value is calculated as a result and in the same way as in the calculating operations on the chip card C. This numerical value (step 107) is then compared to the numerical value SRES received from the set top box STB. When the two numerical values agree, it is assumed that the user has an authorization to implement an appertaining service. In the present exemplary embodiment, the user is thus authorized to request video films from one of the content providers CP.

A connection between the service provider SP as well as the appertaining set top box STB is now subsequently set up. This is usually a narrowband connection. The information that is offered to the user via this connection is encoded with the code word $K_c$ (step 108). For example, the service provider SP offers the user a menu via this connection in which the various services provided by the service provider are listed. According to the present exemplary embodiment, the user will select a video film. The appertaining selection is supplied to the control device SP as a selection signal. A list of films is then offered to the user in response to the appearance of this selection signal. What film should be transmitted to the television set TV is then signalled to the service provider SP with a further selection signal. The selection of a film can potentially be supported by playing video clips on the television set TV. A broadband connection via which the required information is transmitted to the user must then be established for this purpose. After reception of the selection signal, the service provider SP implements an addressing of the relevant content provider CP. This is possible since the service provider SP contains information about what films are stored in which content providers CP.

Subsequently, the service provider SP sets up a connection to the appertaining content provider CP via the relevant switching equipment ATMN. This content provider CP takes a further code word $K_v$ stored together with the video film and transmits this further code word $K_v$ to the service provider SP that encodes it with the code word $K_c$ that has already been calculated and transmits these two quantities to the appertaining set top box STB (step 109). There, on the one hand, the code word $K_v$ is restored and stored. Subsequently, the code word $K_v$ is to encode the video film supplied from the content provider CP via a broadband connection yet to be set up. The content provider CP, however, can also modify the code word $K_v$ based on the criterion of the desired service. When, for example, a video film is to be simultaneously sent to a plurality of users (for example, pay TV), the encoded transmission with a code word $K_v$ is sufficient (step 110). When a video film is to be sent to only one user (for example, video on demand), the code word $K_v$ should be modified user-associated.

At the conclusion of these events, an acknowledge signal is supplied to the service provider SP, as a result whereof the latter is initiated to set up a broadband connection from the content provider CP to the appertaining set top box STB via the transmission network as well as the coaxial network AN. Subsequently, the video films can then be transmitted from the content provider CP to the appertaining set top box with an encoding quantity KC.

The user can implement these operations from any arbitrary set top box STB of a subscriber network. Being bound to one location is thus not required since the identifier of the subscriber is stored centrally in the service provider SP and independently of the set top box STB. A chip card C is inventively provided as the data carrier. Other data carriers such as, for example, a plug-in module can also be employed without limitation. Further, a personal identification number PIN can be employed on the chip card C and sums of money can be electronically registered, these being deincremented upon use of a service from the service provider SP. Pre-paid chip cards can thus also be employed upon use of the described procedures. The amount to be paid for the selected service (for example, a video) is subtracted from a value stored in the chip card. The desired service is implemented only when the chip card acknowledges this action (for example, by sending a number for use in the procedure P to the identifier $K_i$ and a new calculated random number sent from the service provider SP to the set top box STB). The pre-paid chip card can thereby be fashioned either as a "throwaway" card or as a rechargeable card.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for connection handling for use in an interactive service, peripheral control devices and at least one network node forming a transmission network to which are connected at least one storage device and at least one service control device and via which information from the at least one storage device to respectively one of the peripheral control devices and vice versa being conducted using an existing connection, comprising the steps of:

only handling a narrow-band connection setup from a respective peripheral control device of the peripheral control devices to the at least one service control device based on a criterion of a comparison of first and second numerical values when the first numerical value calculated in the respective peripheral control device coincides with the second numerical value calculated in the at least one service control device; and handling a broad-band connection setup between the at least one storage device and the respective peripheral control device following thereupon and based on a criterion of a selection signal output by the respective peripheral control device.

2. The method according to claim 1, wherein the first numerical value is determined in that an identifier is taken from a data carrier of the respective peripheral control device, said identifier together with a random number received from the service control device being supplied as input values to a first procedure that, using a defined algorithm, generates the first numerical value as an output value and sends the first numerical value to the service control device.

3. The method according to claim 2, wherein the second numerical value is determined in that the identifier is stored in the service control device and is supplied together with the generated random number as input values to a second procedure that calculates the second numerical value as an output value.

4. The method according to claim 2, wherein the data carrier has a further identifier that potentially has a temporary character.

5. The method according to claim 2, wherein the data carrier is detachably connected to the respective peripheral control device.

6. The method according to claim 2, wherein a chip card with an integrated processor and a memory device in which the first procedure is implemented is employed as the data carrier.

7. The method according to claim 6, wherein the chip card is a pre-paid chip card.

8. The method according to claim 1, wherein the first and second procedures are identical and the comparison is implemented in the service control device.

9. The method according to claim 1, wherein the first procedure, in addition to generating the first numerical value, also generates a further numerical value with which the information transmitted via the first connection is encoded.

10. The method according to claim 1, wherein a selection signal output by the respective peripheral control device is supplied to the control device via the first connection, the at least one storage device being addressed using the selection signal, whereupon the storage device supplies a code word with information stored therein via the service control device to the respective peripheral control device, the code word being encrypted with a further numerical value during transmission thereof.

11. The method according to claim 10, wherein the code word is modified based on a criterion of a selected service.

12. The method according to claim 1, wherein an acknowledge signal is supplied to the service control device after receipt of the code word by the respective peripheral control device, whereupon, first, the first connection is cleared down and, second, the second connection is set up.

13. The method according to claim 1, wherein the network nodes through-connect information according to asynchronous transfer mode.

14. A method for connection handling for use in an interactive service, peripheral control devices and at least one network node forming a transmission network to which are connected at least one storage device and at least one service control device and via which information from the at least one storage device to respectively one of the peripheral control devices and vice versa being conducted using an existing connection, comprising the steps of:

determining a first numerical value in that an identifier is taken from a data carrier of the peripheral control device, said identifier together with a random number received from the service control device being supplied as input values to a first procedure that, using a defined algorithm, generates the first numerical value as an output value and sends the first numerical value to the service control device;

determining a second numerical value in that the identifier is stored in the service control device and is supplied together with the generated random number as input values to a second procedure that calculates the second numerical value as an output value;

only handling a first connection setup from a respective peripheral control device of the peripheral control devices to the at least one service control device based on a criterion of a comparison of the first and second numerical values when the first numerical value calculated in the respective peripheral control device coincides with the second numerical value calculated in the at least one service control device; and handling a second connection setup between the at least one storage device and the respective peripheral control device following thereupon as warranted, and based on a criterion of a selection signal output by the respective peripheral control device.

15. The method according to claim 14, wherein the first and second procedures are identical and the comparison is implemented in the service control device.

16. The method according to claim 14, wherein the first procedure, in addition to generating the first numerical value, also generates a further numerical value with which the information transmitted via the first connection is encoded.

17. A method for connection handling for use in an interactive service, peripheral control devices and at least one network node forming a transmission network to which are connected at least one storage device and at least one service control device and via which information from the at least one storage device to respectively one of the peripheral control devices and vice versa being conducted using an existing connection, comprising the steps of:

only handling a first connection setup from a respective peripheral control device of the peripheral control devices to the at least one service control device based on a criterion of a comparison of first and second numerical values when the first numerical value calculated in the respective peripheral control device coincides with the second numerical value calculated in the at least one service control device;

supplying a selection signal output by the respective peripheral control device to the control device via the first connection, with which selection signal the at least one storage device being addressed using the selection signal, whereupon the storage device supplies a code word with information stored therein via the service control device to the respective peripheral control device, the code word being encrypted with a further numerical value during transmission thereof;

supplying an acknowledge signal to the service control device after receipt of the code word by the respective peripheral control device;

clearing down the first connection;

handling a second connection setup between the at least one storage device and the respective peripheral control device following thereupon, and based on a criterion of a selection signal output by the peripheral control device.

18. The method according to claim 17, wherein one of a narrowband connection is produced during the course of the first connection setup and wherein a broadband connection is produced during the course of the second connection setup.

19. The method according to claim 17, wherein a chip card with an integrated processor and a memory device in which the first procedure is implemented is employed as a data carrier.

* * * * *